Dec. 23, 1952     E. P. MOSLO     2,622,725
SAFETY MECHANISM FOR CONVEYER TRANSFERS
Original Filed Oct. 14, 1948     2 SHEETS—SHEET 1
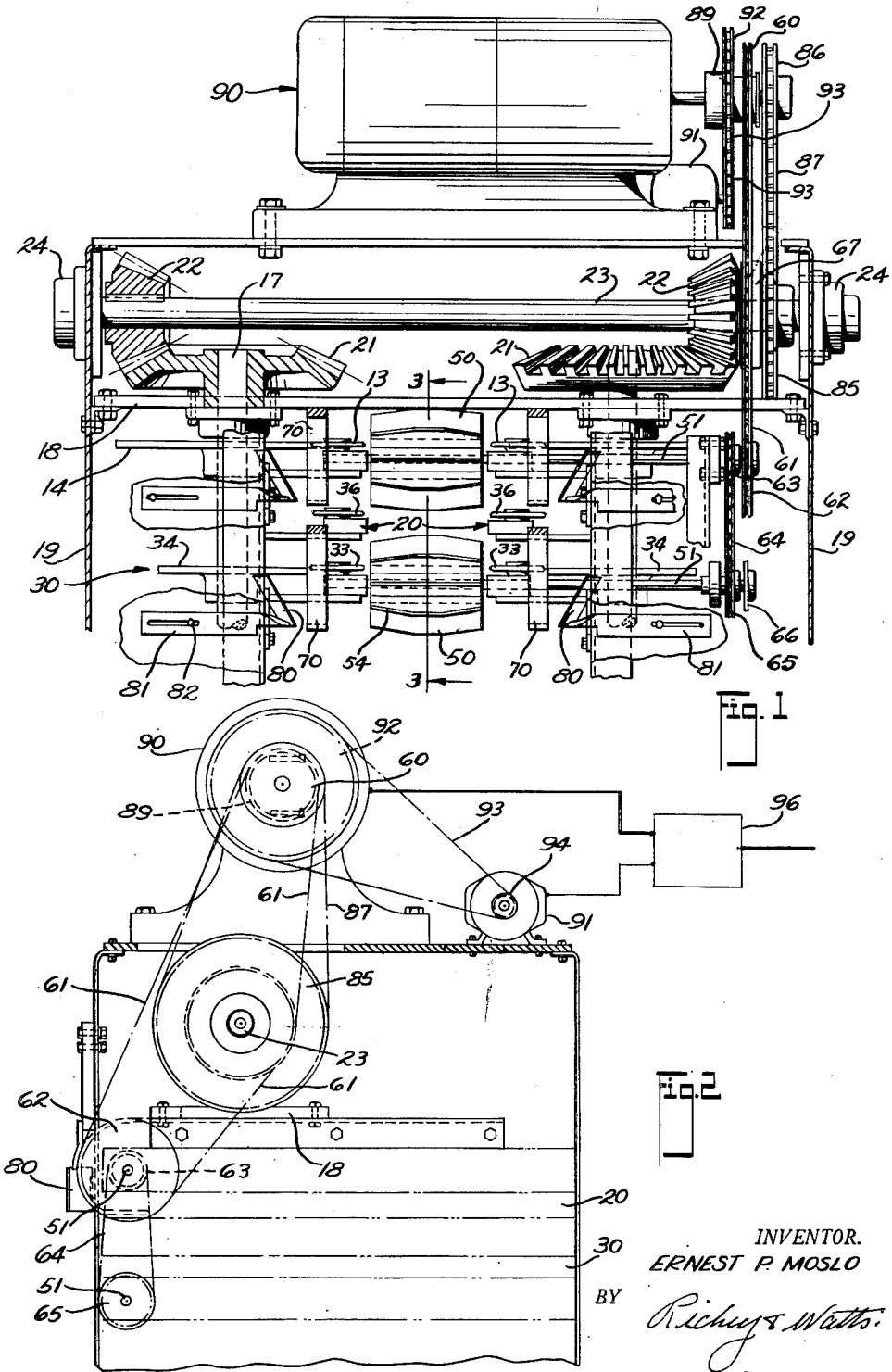
INVENTOR.
ERNEST P. MOSLO
BY
Richey & Watts
ATTORNEYS Dec. 23, 1952     E. P. MOSLO     2,622,725
SAFETY MECHANISM FOR CONVEYER TRANSFERS
Original Filed Oct. 14, 1948     2 SHEETS—SHEET 2
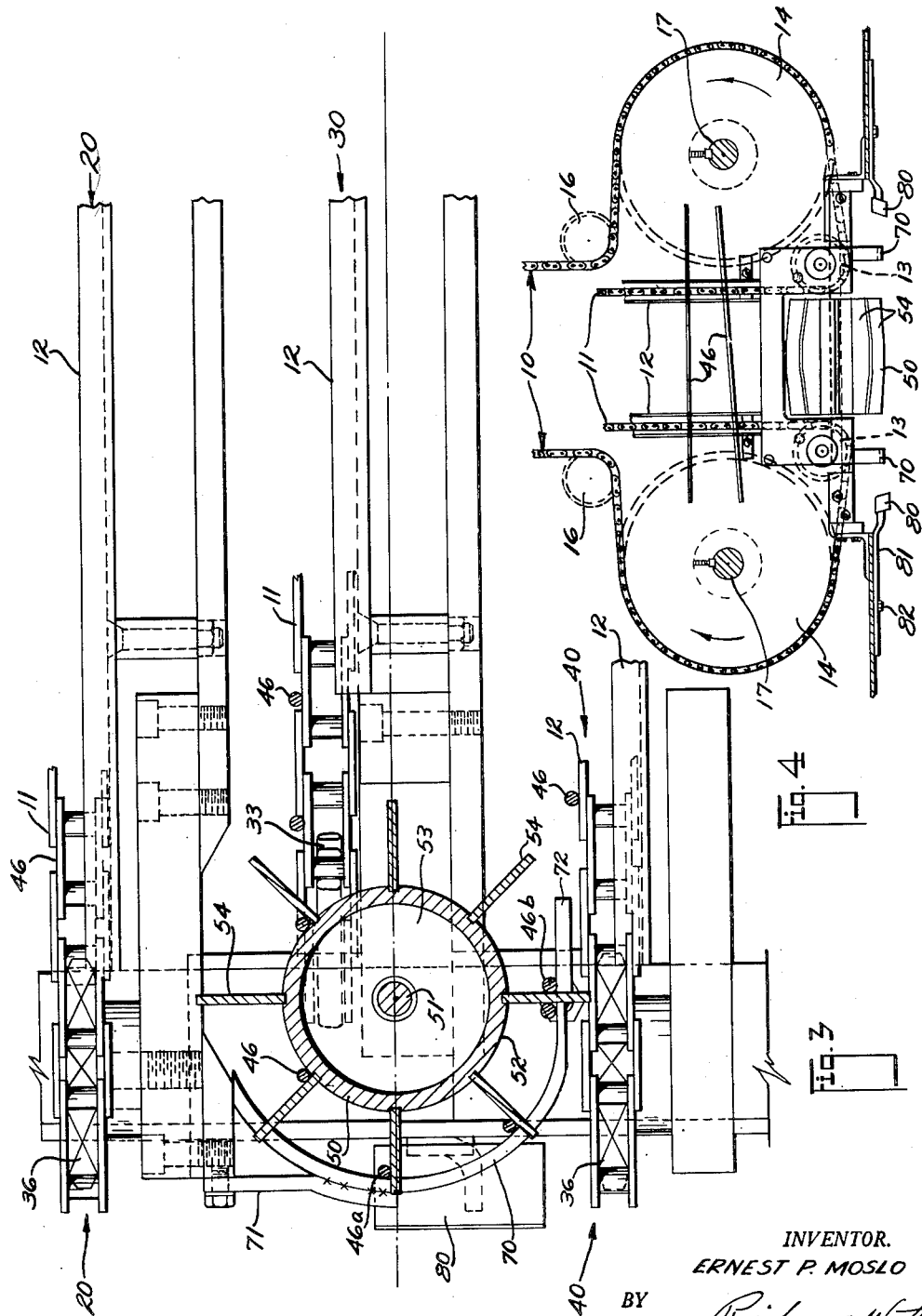
INVENTOR.
ERNEST P. MOSLO
BY
*Richey & Watts*
ATTORNEYS Patented Dec. 23, 1952

2,622,725

UNITED STATES PATENT OFFICE 2,622,725

SAFETY MECHANISM FOR CONVEYER TRANSFERS

Ernest P. Moslo, Cleveland Heights, Ohio

Original application October 14, 1948, Serial No. 54,450. Divided and this application October 26, 1950, Serial No. 192,279

5 Claims. (Cl. 198—232)

This invention relates to article handling, and finds particular application in a system for conveying small articles of generally rod-like shape and transferring them from one conveyor to another.

This application is a division of my application, Serial No. 54,450, filed October 14, 1948, and now abandoned.

One environment in which the invention has been applied is an oven for baking coatings on welding rods. The rods are carried back and forth through the oven a number of times by chain conveyors. This invention may be considered specifically as directed to the problem of transferring the rods automatically from one conveyor to another. In a broader aspect, the invention is directed to the combination of two linear conveyors with novel and improved means for transferring articles from one conveyor to another.

The apparatus which forms the presently preferred embodiment of the invention is particularly suitable for handling of bars, rods, and the like, although other generally elongate and approximately straight pieces could well be handled by the mechanism as shown herein or as slightly modified.

Another aspect of the invention lies in so driving and controlling the conveyor and transfer mechanism as to prevent damage in the event of jamming of the transfer mechanism.

As stated, the invention may be applied to a chain conveyor system in an oven, but since the invention claimed herein is independent of such environment and since the structure of the oven as such is not necessary to an understanding of the invention, the disclosure herein will, for conciseness, be concerned only with the novel conveying mechanism.

Conveyors consisting of parallel chains across which articles to be conveyed are laid, such as are preferably employed in the invention, are well known. Therefore, only so much of the chain conveyor per se as is necessary to an understanding of the invention will be described herein.

The principal objects of the invention are to convey articles by a series of conveyors and transfer them smoothly and precisely from one conveyor to another; to transfer elongate articles, arranged on a conveyor for movement transversely to the axes of the articles, to another such conveyor and to preserve the alignment and spacing of the articles; to automatically and precisely center and align articles deposited on a conveyor; and to prevent casualties resulting from accidental dislocation of conveyed articles.

The manner in which the principal objects, as well as various ancillary objects and advantages of the invention, are realized will be apparent to those skilled in the art from a consideration of the preferred embodiment of the invention as described herein.

Referring to the drawings:

Fig. 1 is an elevation view projected on a plane perpendicular to the direction of movement of the conveyors;

Fig. 2 is a side elevation of a diagrammatic nature further illustrating the driving and controlling arrangement for the conveyors;

Fig. 3 is a partial sectional view taken on the plane indicated in Fig. 1; and

Fig. 4 is a partial plan view.

As stated, the invention has found application in an oven for baking coatings on welding rods, but since the invention is independent of this particular environment and may be described without reference thereto, description of the oven and of the known conveyor mechanisms has been eliminated insofar as practicable in the interest of conciseness.

The general layout of the invention may, perhaps, be most easily appreciated from the plan view of Fig. 4 in which is depicted the delivery end of one of the chain conveyors (which is also the end at which the conveyor is driven) in association with the novel transfer mechanism. Each conveyor consists of two parallel chains 11 which may be supported in channel members 12, the chains running parallel and in the same horizontal plane lengthwise of the oven, passing around idler wheels 13, driving sprockets 14 and idler wheels 16 from which the return runs of the chains proceed idly to the opposite end of the chain conveyor where it is loaded. The driving sprockets 14 are fixed to vertical shafts 17 which are driven at the same speed.

Referring to Fig. 1, it will be observed that the shafts 17 are supported in bearings in a cross frame member 18 of the oven, the side plates 19 of which are shown in Fig. 1, and bevel gears 21 on the shafts 17 are driven by bevel gears 22 mounted on a cross shaft 23 supported in bearings 24. Additional conveyors traveling in the same direction as the conveyor 10 are disposed below the conveyor 10 and are structurally similar. The conveyor 30, for example, is illustrated in part in Fig. 1, being guided by idlers 33 and driven by gears 34 on the shaft 17. As will be noted, the gears 34 are smaller than the gears 17 with the result that the conveyor 30 is slower than the conveyor 10. Between the conveyors 10 and 30, the active runs of which move toward the plane of Fig. 1, is a conveyor, indicated generally as 20, of the same general character as the chain conveyors 10 and 30 and comprising a run of chain proceeding away from the plane of Fig. 1, the sprockets 36 reversing the chain. Likewise, below the conveyor 30 may be a conveyor 40, as shown in Fig. 3, similar to conveyor 20 and moving in the same direction. The conveyors 20 and 40 may be driven by mechanism at the opposite end of the oven similar to the mechanism by which the conveyors 10 and 30 are driven.

In Fig. 3, which is a sectional view taken on the plane intermediate the two halves of the conveyor, portions of conveyors 20, 30, and 40 are shown, with the chains 11 sliding in channel members 12, the conveyors 20 and 40 moving to the right in the figure and the conveyor 30 to the left. The return sprockets 36 of the return conveyors are mounted in any convenient manner in the fixed frame of the machine and likewise the idler sprocket 33 of the conveyor 30. The driving sprocket 34 of that conveyor is not illustrated in Fig. 3. The fixed structure of the oven, including the framework and brackets by which the conveyors and their driving mechanisms are mounted and supported in place may be varied to suit the individual installation. As they are not necessary to an understanding of the invention, they will not be elaborated upon herein.

The conveyors are particularly adapted to carry rod-like articles such as welding rods 46, which are disposed transversely of the direction of movement of the conveyor chains as shown in Figs. 3 and 4.

The invention is concerned with coordinating the several conveyors so as to transfer the welding rods from one conveyor to another and insure that they remain properly oriented and aligned on the conveyors.

The conveyors have been described in sufficient detail to form a basis for the description of the novel organization of which the principal moving parts are transfer drums 50, a drum being provided at the discharge end of each conveyor, except the final one, to transfer the rods to the next succeeding conveyor. Two of the drums 50 are illustrated in Fig. 1 and a single drum in Figs. 3 and 4. As will be apparent, each drum is of cylindrical form, of length slightly less than the spacing between the chains 11, and disposed adjacent the delivery end of the chain. Preferably, as shown most clearly in Fig. 3, the axis of the drum is disposed below the conveyor, such as 30, from which it accepts the rods 46, and adjacent the end of the chain. Each drum 50 is mounted on a shaft 51 and is keyed in any suitable manner to rotate therewith, the shafts 51 extending transversely of the oven (Fig. 1) and being supported in any suitable manner. The shafts 51 are driven by a suitable power transmission mechanism geared to the drive means for the shaft 23 so that the drums rotate at speeds appropriate to the speeds of the conveyors. A preferred arrangement for this purpose consists of a sprocket 60 driven by a motor 90 which also drives the conveyor chains, coupled by an endless chain 61 to a sprocket 62 on the upper shaft 51. A sprocket 63 on this shaft is coupled by a second endless chain 64 to a sprocket 65 on the second shaft 51. If additional shafts 51 are provided they may be driven in the same manner, as, for example, by a chain driven by the sprocket 66 (Fig. 1). It will be noted that the sprocket 65 is larger than the sprocket 63 so that the drum 50 in Fig. 1 rotates more slowly than the upper drum in accordance with the previously stated fact that the conveyor 30 travels more slowly than the conveyor 10. A collar 67 on the shaft 23 keeps the chain 61 clear of the shaft.

The transfer devices 50 in their preferred form each comprise a cylinder 52 supported on the shaft 51 by disks or wheels 53 and fitted with outwardly extending plates 54 somewhat similar to a paddle wheel. The plates 54 may be welded or otherwise secured in place, and are preferably approximately eight in number. The proportions of the device have not been found to be critical, but it is believed to be preferable to provide the blades 54 with a somewhat convex outer edge so that the wheel 50 as a whole has a somewhat barrel-shaped appearance. As will be most readily appreciated from Fig. 3, as the rods 46 are carried to the left on the conveyor 30 and the wheel 50 rotates counter-clockwise, the rods will be lifted from the conveyor chains and carried upward on the periphery of the drum by a blade 54, being thus lifted free of the chain. The drum and blades correct the angular alignment of the rods if they should happen to be out of accurate perpendicular relation to the conveyors. As the wheel turns, the rods will, of course, move around with it and ultimately when the blade becomes approximately level, the rods will tend to roll outwardly as indicated by the rod 46a in Fig. 3. The rods are retained in position to be moved by the drum by generally semi-circular guide strips 70 which may be mounted in any convenient manner, as by a bracket 71 welded to the guide strip and bolted to a fixed part of the oven. As will be apparent from Fig. 4, the guide 70 is approximately concentric with the shaft 51 and spaced therefrom a distance less than the radius of the drum and blades, so that, as the drum rotates, the rods may descend by gravity along the upper surface of the guide 70, being restrained in their downward movement by the blades 54. Preferably, the terminal or the lowermost portion 72 of the guides is approximately level so that the rods reaching the position indicated by the rod 46b in Fig. 3 no longer tend to roll from the guide by gravity but are propelled therefrom by a blade 54 until they drop off the end of the guide onto the chain 12 immediately below the plane of the guides.

The preferred form as illustrated embodies a single drum with guides beyond each end of the drum. As will be apparent, modifications of structure retaining the principles of this structure may be made. For example, a drum or wheel with pins projecting therefrom may be substituted for the drum 50 and blades 54. In case pins are used, the guide 70 may be between the pins instead of beyond the end of the drum; and in such case, a single relatively wide guide 70 may be employed. In any event, whether pins or plates are used, the rod 46b is engaged at widely spaced points as it is pushed from the portion 72 of the guide and is thus deposited on the chain 12 in accurate angular alignment.

It will be apparent that the conveyor 30 could be higher relative to the drum 50 than shown in Fig. 3 so that the plane of the chain is above that of the drum. In such case, the rods are not initially lifted by the drum, but are pushed off by the plates 54. The conveyor may be so located that the rods fall from the conveyor into the pockets between the plates 54. The general arrangement illustrated, however, is believed to result in smoother and more satisfactory operation, with a minimum of free movement of the rods.

It will be apparent also that if the direction of movement of the mechanism is reversed and the lower end portion 72 of the guide is inclined so as to extend below the plane of the top of the conveyor 40, the transfer device 50 would effectively elevate rods from the lower conveyor 40 and deposit them on the upper conveyor 30.

The rods, perhaps because of vibration of the conveyor chains, sometimes may slide axially of the rods while traveling through the conveying system, and therefore the transfer device incorporates a centering structure to align the rods transversely of the conveyors as they are transferred from one conveyor to another.

The centering or aligning means comprises plates 80 which, as illustrated in Figs. 1 and 4 may be mounted on brackets 81 mounted on a fixed end plate or other fixed structure of the oven by screws 82, the screws passing through slots in the brackets 81 so that the aligning plates 80 may be adjusted in accordance with the length of the rods. The plates 80 of each set converge in the downward direction, which is that pursued by the rods. If the rod extends too far in either direction, it will be shifted to a central position as it passes between the plates 80.

The means by which the conveyors 10 and 30 are driven from the shaft 23 have been described. The shaft 23 is fitted with a sprocket 85 driven by a sprocket 86 through a chain 83. The sprocket 86 is keyed to the output shaft 88 of any suitable motor and reduction gear combination indicated generally at 90. The sprocket 63 which drives the transfer mechanisms is fixed to the driven member of an adjustable friction clutch 89 mounted on and driven by the motor shaft 88.

The friction clutch 89 also drives an overload control switch 91 through sprocket 92 on the clutch, chain 93, and sprocket 94. This overload control switch may be of the type known as a "General Electric Plugging Switch," Catalogue No. CR-2962-A1A. The plugging switch contains a fixed contact and a movable contact which is held in engagement with the fixed contact as long as the speed of the plugging switch shaft is held above a certain predetermined value, which value is in excess of the normal running speed of the conveyor transfer mechanism. The switch 91 is connected to the control panel 96 through which the motor is energized. If any jamming of the transfer mechanism occurs, which it might if the rods should, for some reason, become badly misaligned on the chain conveyor, the driving resistance of the transfer mechanism will increase. The transfer mechanisms require very little normal operating torque and the friction clutch 89 is set so as to slip whenever the load materially exceeds the normal operating load. Thus, if a rod 46 gets out of place and jams one of the drums 50 in any way, the load increases, the transfer mechanism stops due to slipping of the clutch 89, and for the same reason, the rotation of the plugging switch is interrupted. When this happens, the movable contact of the plugging switch is no longer urged into engagement with the fixed contact and the opening of a circuit at this point, through appropriate relay circuits, stops the motor 90 thereby stopping the entire conveyor mechanism. Thus, immediately after the transfer devices are stopped by slipping of the clutch, the conveyors are stopped by interruption of power so that no more material is brought to the ends of the conveyors.

The arrangement of circuits by which the plugging switch stops the motor can be merely a matter of standard electrical design and will vary in type with the character of current supply and type of motor. The details of the circuits are not material to the invention. The circuit arrangement for stopping the motor may, in any conventional way, energize or de-energize other devices connected with the oven and sound an alarm indicating trouble in the machine.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

What is claimed is:

1. In combination, a first article conveyor, a second article conveyor, a transfer device to transfer articles from the first to the second conveyor, a motor for driving the conveyors and the transfer device, a slip clutch driven by the motor, driving means for the transfer device driven by the slip clutch, a speed-responsive switch device operably joined to the transfer device, and means responsive to decrease in speed of the switch device below a predetermined value to stop the motor.

2. In combination, a first article conveyor, a second article conveyor, a transfer device to transfer articles from the first to the second conveyor, a motor for driving the conveyors and the transfer device, a slip clutch driven by the motor, driving means for the transfer device driven by the slip clutch and normally operating the transfer device at a speed proportional to the speed of the conveyors, a speed-responsive switch device operably joined to the transfer device, and means responsive to decrease in speed of the switch device below a predetermined value to de-energize the motor.

3. In combination, a first article conveyor, a second article conveyor, a transfer device to transfer articles from the first to the second conveyor, a motor for driving the conveyors, an electrical circuit for said motor, a slip clutch driven by the motor, driving means for said transfer device driven by the slip clutch and normally operating the transfer device at a speed proportional to the speed of the conveyors, a make and break device in the circuit, control means for holding the make and break device in the circuit closing position during the normal operation of the driving means for the transfer device and for actuating the make and break device to the circuit opening position as the speed of the driving means for the transfer device falls below a predetermined value thereby de-energizing the motor.

4. In combination, a first article conveyor, a second article conveyor, a transfer device to transfer articles from the first to the second conveyor, a motor for driving the conveyors, an electrical circuit for said motor, a slip clutch driven by the motor, driving means for said transfer device driven by the slip clutch and normally operating the transfer device at a speed proportional to the speed of the conveyors, a make and break device in the circuit, driving means for the make and break device driven by the slip clutch at a speed proportional to the speed of the transfer device, and means operably joined to the driving means for the make and break device for holding said device in circuit closing position, said device opening the circuit when the speed of the driving means for the transfer device falls below a predetermined value thereby de-energizing the motor.

5. In combination, a first article conveyor, a second article conveyor, a transfer device to transfer articles from the first to the second conveyor, a motor for driving the conveyors, an electrical circuit for said motor, a slip clutch driven by the motor, driving means for said transfer device driven by the slip clutch and normally operating the transfer device at a speed proportional to the speed of the conveyors, a make and break device in the circuit, driving means for the make and break device driven by the slip clutch at a speed proportional to the speed of the transfer device, and means operably joined to the driving means for the make and break device for holding said device in circuit closing position, said device opening the circuit when the speed of the driving means for the make and break device falls below a predetermined value thereby de-energizing the motor.

ERNEST P. MOSLO.

REFERENCES CITED

The following references are of record in the file of this patent:

UNITED STATES PATENTS

| Number | Name | Date |
|---|---|---|
| 1,520,000 | Baker et al. | Dec. 23, 1924 |
| 2,373,325 | Mayer | Apr. 10, 1945 |

FOREIGN PATENTS

| Number | Country | Date |
|---|---|---|
| 520,699 | Germany | Mar. 13, 1931 |